June 27, 1933. W. C. HEDGCOCK 1,916,143
TRUCK
Filed Sept. 18, 1931 7 Sheets-Sheet 2
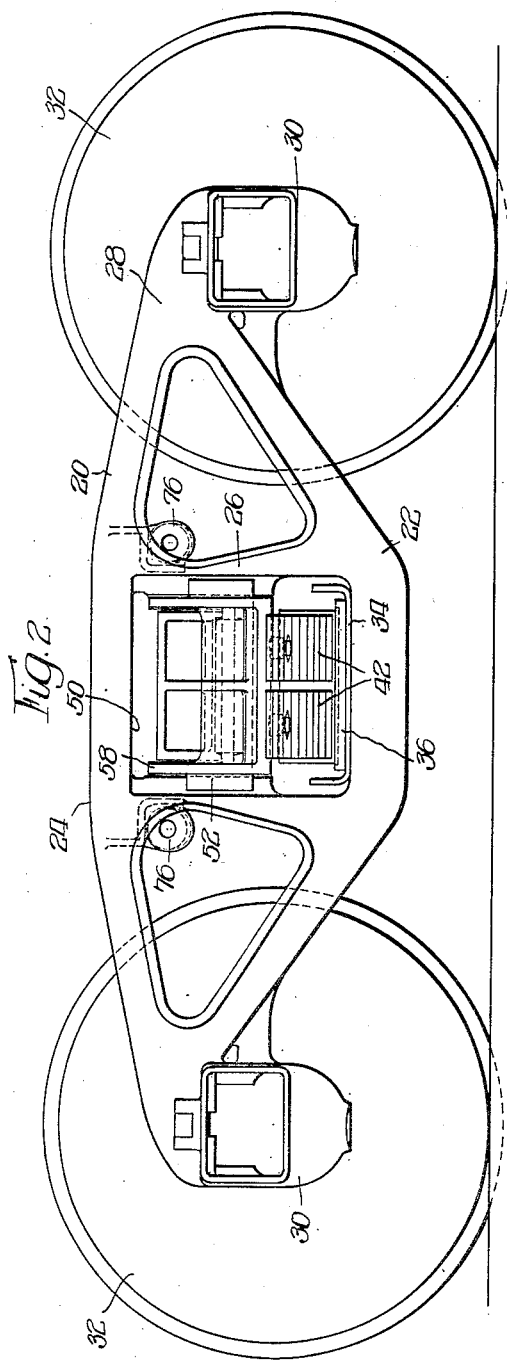
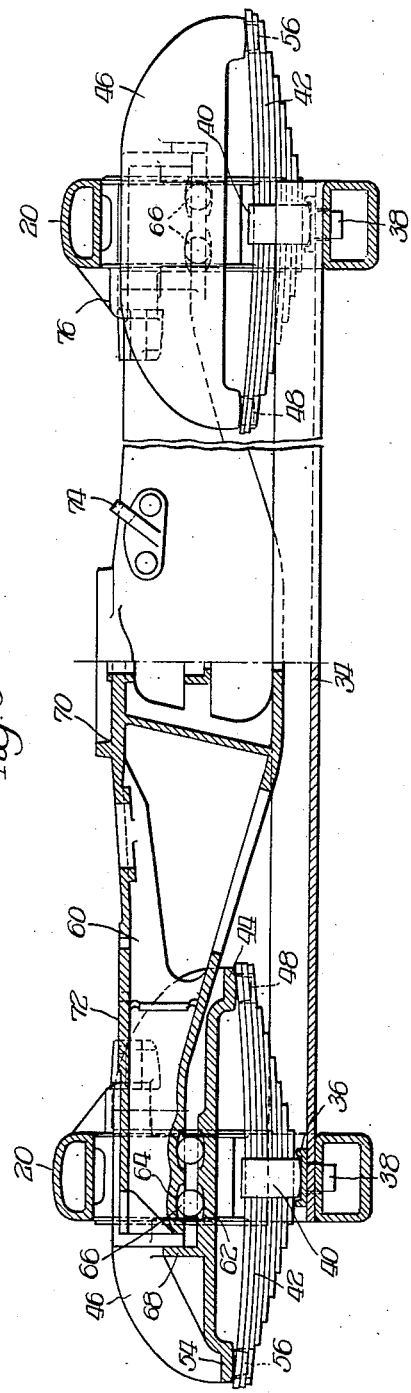
Inventor:
William C. Hedgcock,

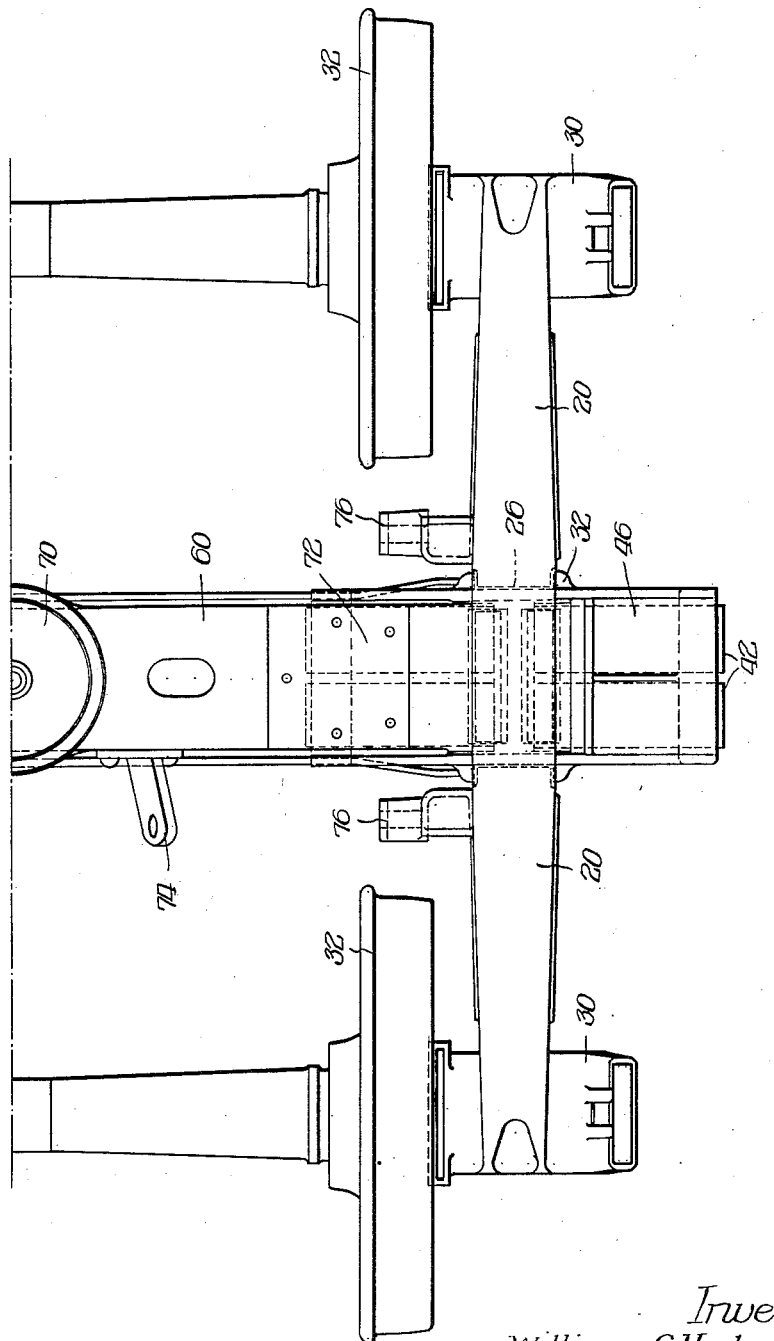

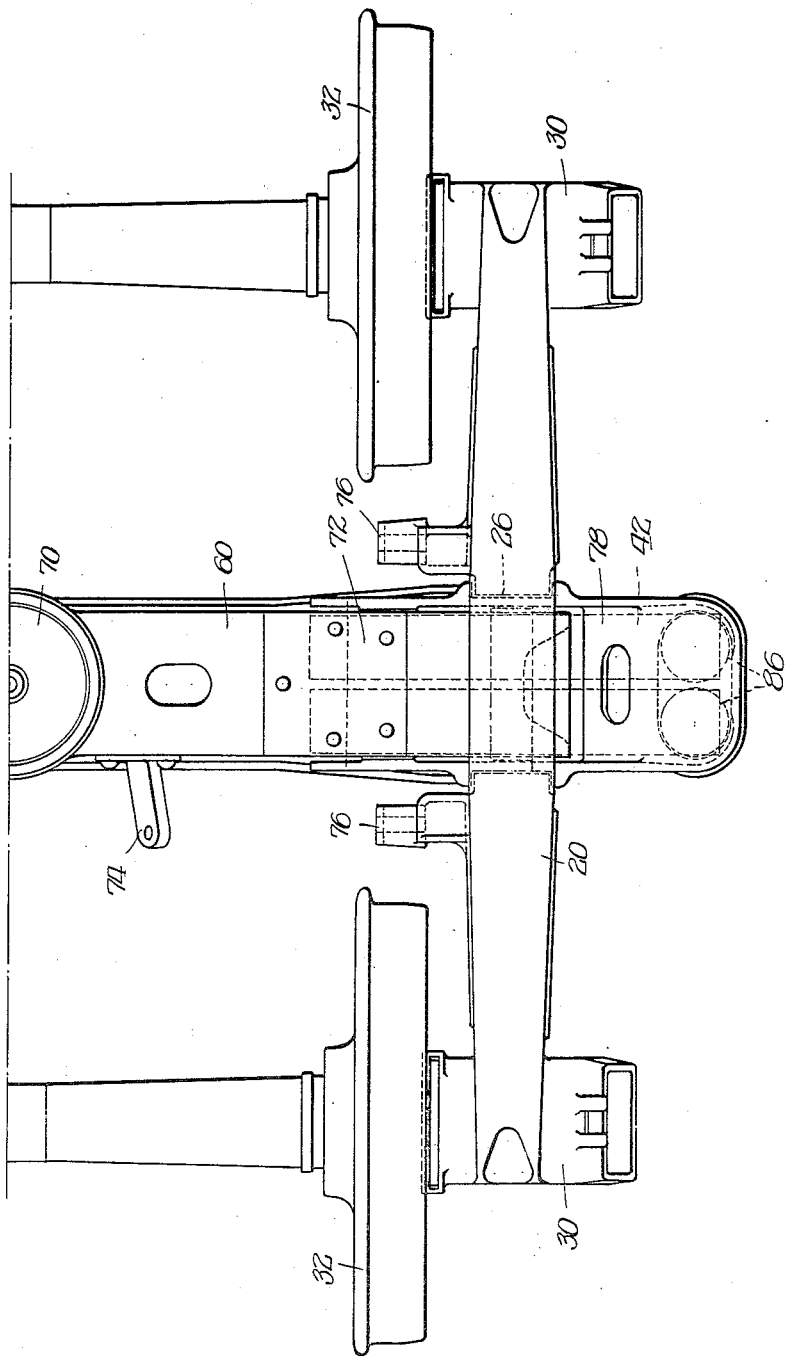

June 27, 1933. W. C. HEDGCOCK 1,916,143
TRUCK
Filed Sept. 18, 1931 7 Sheets-Sheet 4
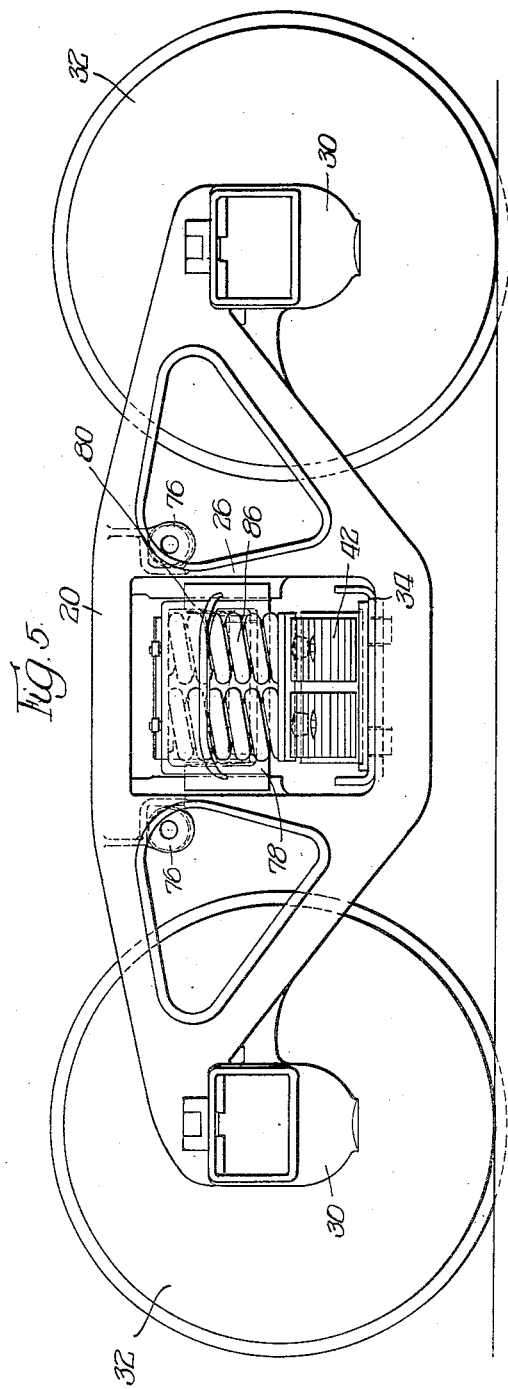
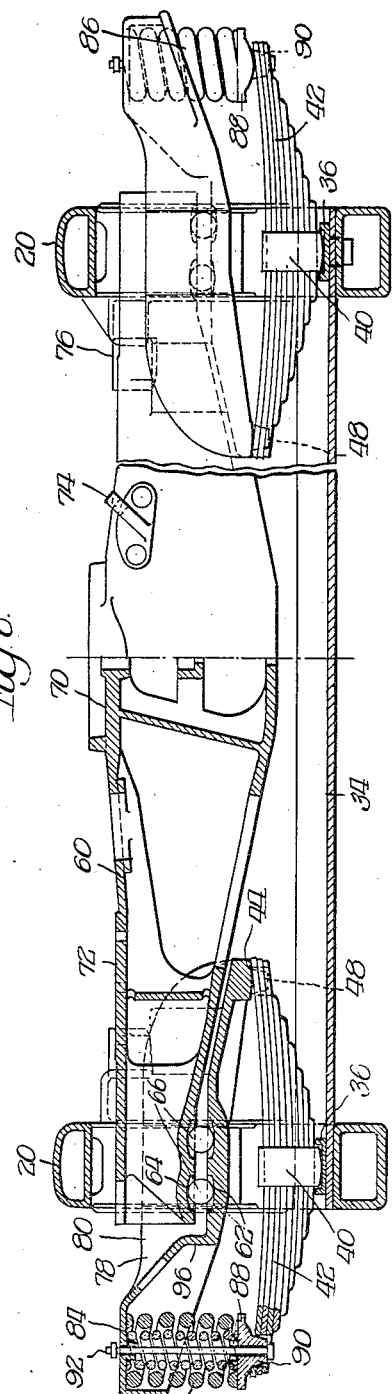
Inventor:
William C. Hedgcock,
By Wilkinson, Huxley, Byron & Knight

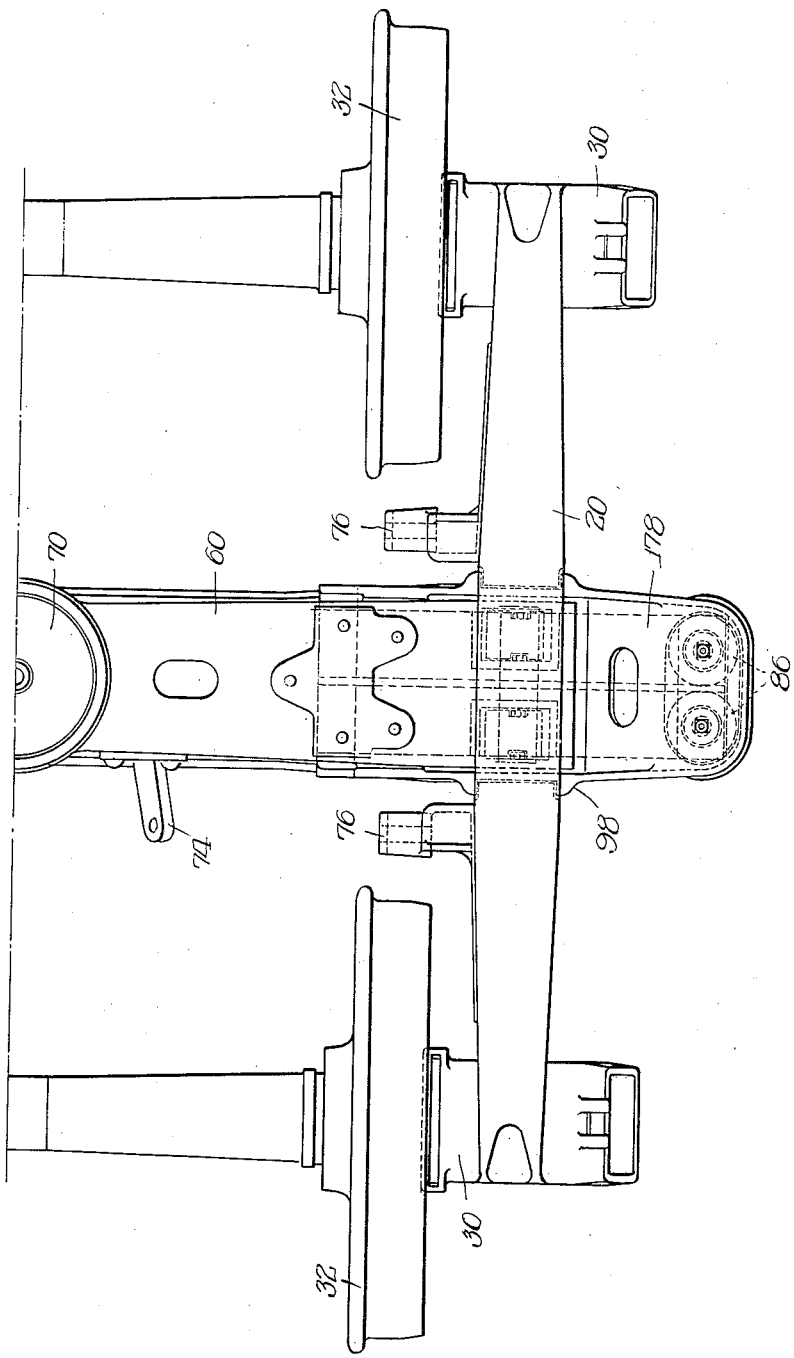

June 27, 1933. W. C. HEDGCOCK 1,916,143
TRUCK
Filed Sept. 18, 1931 7 Sheets-Sheet 6
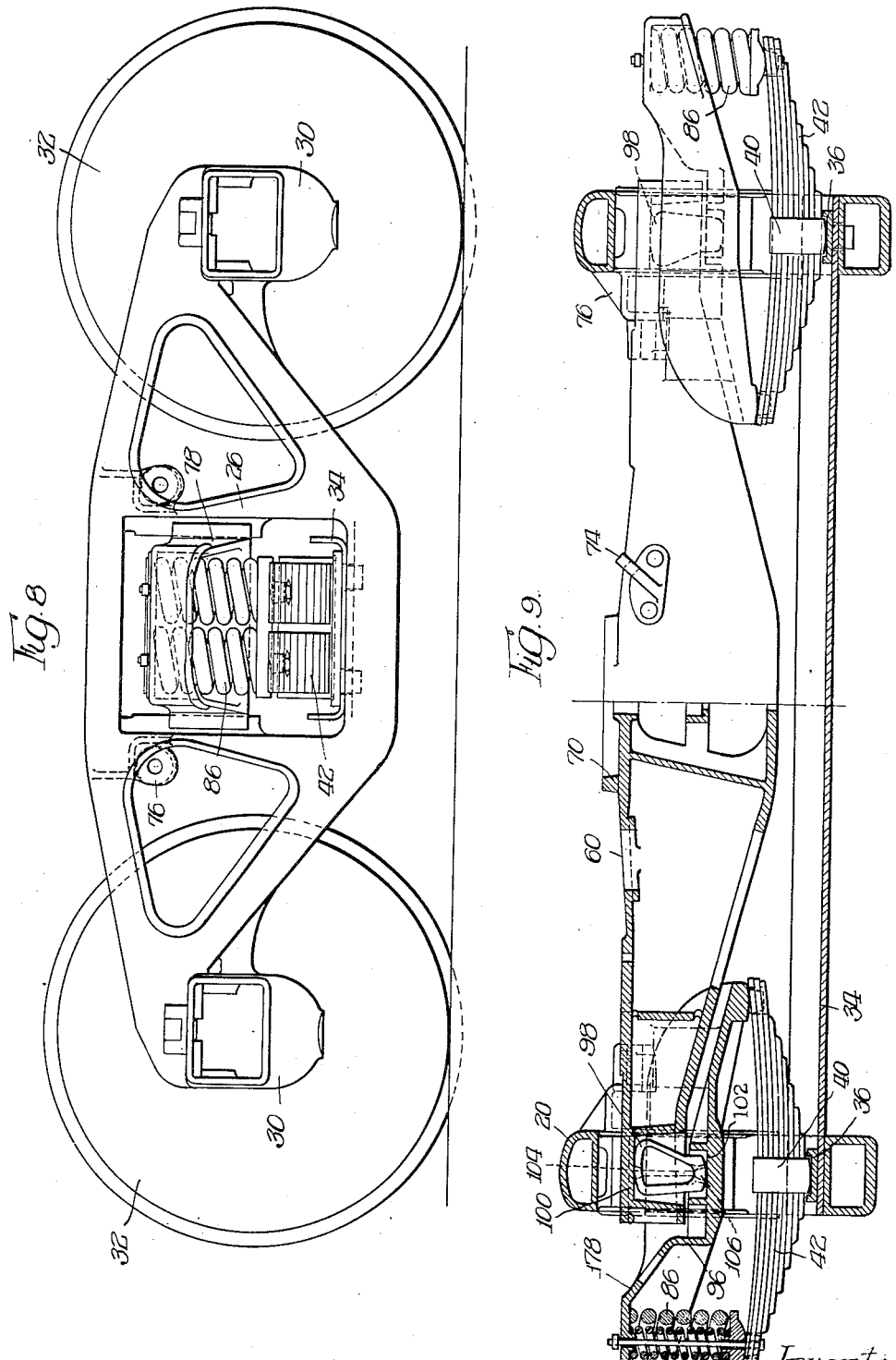

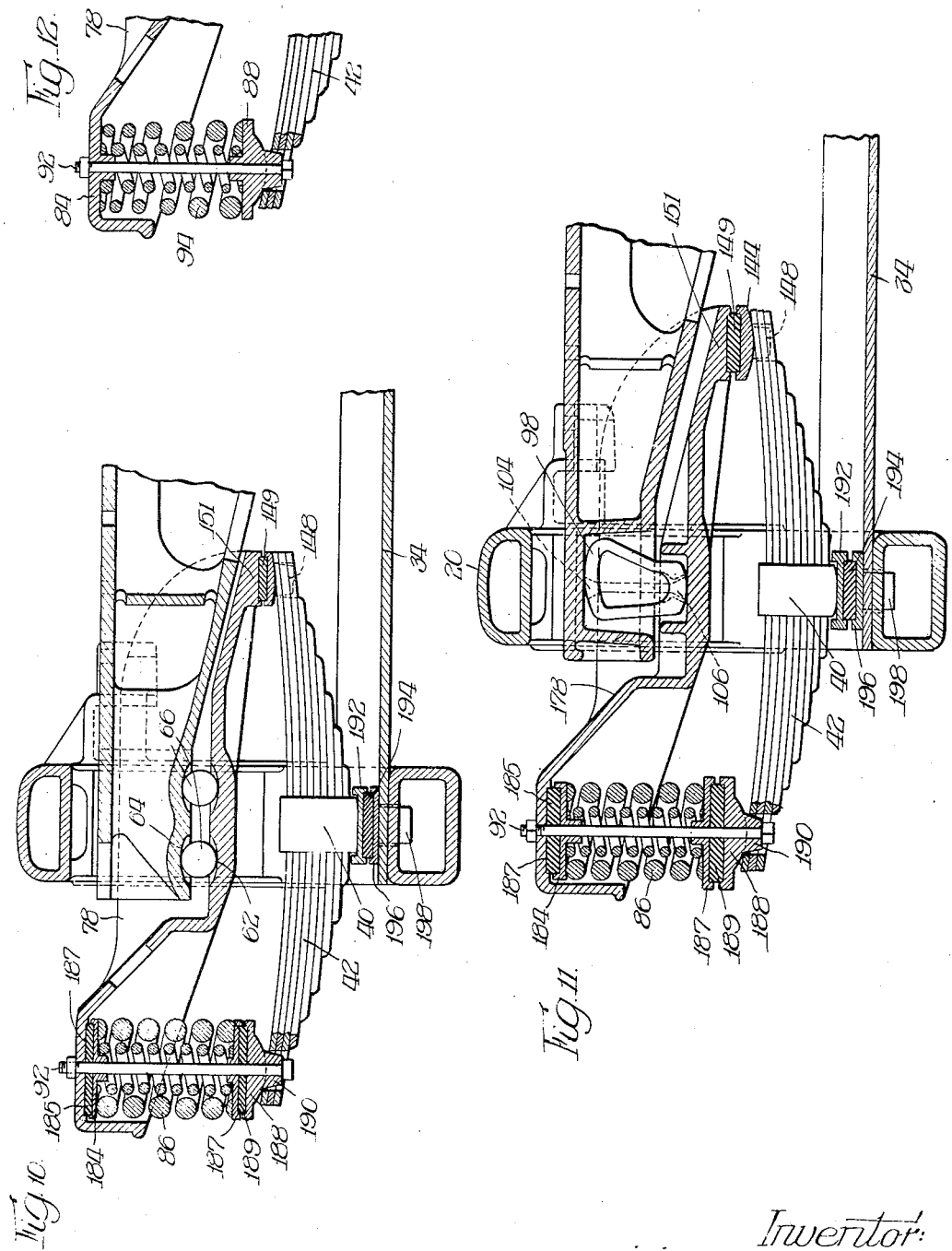

Patented June 27, 1933

1,916,143

UNITED STATES PATENT OFFICE

WILLIAM C. HEDGCOCK, OF WILMETTE, ILLINOIS, ASSIGNOR TO AMERICAN STEEL FOUNDRIES, OF CHICAGO, ILLINOIS, A CORPORATION OF NEW JERSEY

TRUCK

Application filed September 18, 1931. Serial No. 563,483.

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

Passenger car trucks are generally easy riding, due to the use of both coil and elliptic leaf springs in series; the coil springs responding to the light, quick shocks, the leaf springs to the slow, heavy impulses. Coil springs are quick and sensitive in response, leaf springs relatively less so, partly due to frictional work absorption between the leaves. For this reason, and also by providing coil and leaf springs of different natural vibration periods, they tend to dampen each other's synchronous vibration without impairing free spring response. This condition is obtained by having the different springs in series. Placing leaf and coil springs in parallel is not sufficient, since they then act as a unit and have a common period of vibration.

Although the usual passenger car truck with series arrangement of coil and leaf springs gives good riding qualities, it is undesirably heavy, costly and complicated for freight service. This is partly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object of the invention is to provide a car truck wherein the spring suspension is such that springs of different character are placed in series.

Yet another object of the invention is to provide a car truck having springs of different characteristics in series and so disposed that complete duplication of carrying capacity is not required in both kinds of springs.

A further object of the invention is to provide a car truck having springs of different character which are adapted to work independently of each other whereby shocks incident to operation are adequately absorbed.

A still further object of the invention is to provide a car truck wherein the springs are arranged so that each dampens out the other's vibration.

A yet further object is to provide a truck construction wherein resilient pads are provided for dampening out metallic vibrations transmitted through the metallic truck parts, and also for the purpose of deadening noise.

Another further object is to provide a truck construction wherein resilient and friction and/or resilient means are disposed in series.

A different object is to provide spring assemblies wherein there is provided softer cushioning action under light loads, while at the same time providing the necessary stiffness and capacity under heavy loads, these features being combined also to provide a construction which reduces any tendency toward synchronous vibration of the springs.

Another object of the invention is to provide a truck having a plurality of equalizing means operating at one point.

Yet another object of the invention is to provide a truck having solid and resilient equalizing means.

Still another object of the invention is to provide a truck having solid and resilient equalizing means and wherein the bolster is permitted lateral movements.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary top plan view of a truck embodying the invention;

Figure 2 is a side elevation of the truck shown in Figure 1;

Figure 3 is a transverse sectional elevation through the bolster and side frame of the truck shown in Figures 1 and 2;

Figure 4 is a fragmentary top plan view of a modified form of the truck embodying the invention;

Figure 5 is a side elevation of the truck shown in Figure 4;

Figure 6 is a transverse sectional elevation through the bolster and side frame of the truck shown in Figures 4 and 5;

Figure 7 is a fragmentary top plan view of another modified form of a truck embodying the invention;

Figure 8 is a side elevation of the truck shown in Figure 7;

Figure 9 is a transverse sectional elevation through the bolster and side frame of the truck shown in Figures 7 and 8;

Figures 10, 11 and 12 are transverse fragmentary sectional elevations through further modified forms of truck construction.

Referring first of all more particularly to the truck construction shown in Figures 1, 2 and 3, the side frame 20 is of integral truss construction, and includes the tension member 22, the compression member 24, and the spaced column guides 26 connecting the tension and compression members. In the truck shown the tension and compression members merge adjacent their ends as at 28 and are provided with the usual standard A. R. A. journal box 30 cooperating with the journal ends of the wheel and axle assemblies 32. It will of course be understood that the journal box may be separate or of any desired construction, and that the wheel and axle assemblies may also be of any desired construction. The spaced side frames are connected by the spring plank 34 extending transversely of the truck, the spring plank being provided with the vertically disengageable spring seat 36, preferably disposed on the longitudinal center line of the side frames and laterally positioned by means of the dowels 38 which extend through apertures in the spring plank and side frame whereby the spring plank and side frame are also connected thereby. Alternatively, the spring seat may be placed to one side of the longitudinal center line of the side frame, in which case the spring plank will serve as a supporting beam as well as a tie between the side frames.

The spring seats 36 are adapted to accommodate the spring band 40 of the semi-elliptic springs 42, which band is preferably provided with an arcuate seat engaging portion. The inner end of the semi-elliptic springs has supporting cooperation with the spring seat 44 provided on the loading, load distributing or equalizing member 46, the spring seat including the depending positioning dowel 48 received in a suitable aperture provided in the spring assembly. The equalizing member 46 is mounted in the bolster opening 50 provided between the tension and compression members and the column guides, the equalizing member being provided with spaced guide lugs 52 embracing the column guides whereby the equalizing member is maintained in lateral relation with the side frames, yet with freedom for vertical movement. It is understood that the guide lugs 52 are so spaced as to provide enough lateral clearance with the column to permit of a certain amount of oscillating movement of the equalizing member with respect to the side frame to compensate for spring action. The equalizing member is provided with a portion extending outwardly of the side frames and having a spring seat 54 similar to the spring seat 44 engaging the outer end of the leaf spring assembly and being provided with a positioning dowel 56 engaged in a suitable aperture in the outer end of the leaf spring assembly.

The equalizing member is provided with upstanding flanges 58 adapted to cooperate with the column guides 26 for guiding engagement with the faces thereof. The upstanding flanges embrace the outer ends of the bolster 60 which extend into the bolster opening. The equalizing member and the bolster are provided with anti-friction roller engaging seats 62 and 64, respectively, between which seats anti-friction rollers 66 are mounted whereby lateral movement of the bolster is permitted. A stop 68 provided on the equalizing member serves to limit this lateral movement. The bolster is of conventional construction, being provided with the center and side bearings 70 and 72, and the bolster and side frames are provided with the brake hanger brackets 74 and 76 respectively.

In the construction shown in Figures 4 to 6 inclusive, and in Figures 10 and 12, the same type of side frame 20 is contemplated, the side frames being spaced and connected by means of the spring plank 34, and being provided with the spring seats 36 for rockably receiving the spring band 40 of the semi-elliptic leaf spring assembly 42. The inner end of the spring assembly is adapted to engage the spring seat 44 of the loading, load distributing or equalizing member 78, the spring seat being provided with the positioning dowel 48 received in a suitable aperture provided in the inner end of the spring assembly. The equalizer 78 is provided with the upstanding flanges 80 having cooperation with the column guides 26 and the outer end of the equalizer member is provided with a coil spring housing 82 disposed outwardly of the side frame and being provided with a coil spring seat 84.

The coil spring assembly 86 is seated on a seat 84 and on the spring seat 88, said spring seat being provided with a depending positioning dowel 90 positioned and received in a suitable aperture provided in the outer end of the leaf spring assembly. Bolts 92 are provided connecting the spring seats and coil spring equalizing member to facilitate assembly. The coil springs shown in Figures 4, 5 and 6 are of constant pitch and section. The coil spring assembly shown in Figure 12 at 94 is one of variable stiffness, being of variable section as in the case of a spring formed from a tapering bar. It will of course be understood that a spring of variable pitch and constant section, or any other type of spring such as shown in application Serial No. 552,153, filed July 21, 1931, may be used.

The equalizer and the bolster 60 are provided with anti-friction roller seats 62 and 64 for receiving the anti-friction rollers 66 as already described, the equalizer being provided with a stop 96 for limiting lateral movement of the bolster. The bolster is provided with the center and side bearings 70 and 72. The bolster and side frame are provided with the brake hanger brackets 74 and 76.

In operation the coil and leaf springs are in series, and the function and operation thereof is the same as that described in application Serial No. 559,617, filed August 27, 1931, with the exception that in the present case, instead of the load being transmitted to the several spring elements directly by the bolster, the bolster transmits its load through the lateral motion means or anti-friction members to a centrally disposed portion of the equalizing member 78 which serves as a relatively non-resilient means for properly distributing the loads to the resilient spring elements in the same manner as though it were transmitted directly from the bolster to the spring assemblies. The equalizing member serves as an equalizing means for distributing the load in the desired ratio to the different spring positions, and also serves as a guide for the truck bolster and as a simple means for carrying the lateral motion means.

In the modifications illustrated in Figures 7 to 9, and 11 lateral motion rockers 98 are provided. In this case the side frame 20, bolster 60, loading, load distributing or equalizer 178, and coil and leaf spring assemblies 86 and 42 are contemplated, as described above, the spring band 40 seating in the seat 36 disposed on the spring plank 34 and the side frame tension member. However, in these modifications, the bolster and equalizing member are provided with pockets 100 and 102 forming rocker seats for the rocker members 98. The rockers support the bolster for lateral movement, there being provided rocker positioning means 104 and 106 interengaging with the respective rocker seats and rockers to maintain the rockers in proper position with respect to the seats.

The rockers shown have their radii of such proportion that the bolster end will be raised on movement outwardly, and maintained at substantially a constant elevation on movement inwardly. However, it is understood that the proportions of the rockers may be reversed so that this condition is reversed, or any other combinations of radii may be used on the rockers to provide for the character of motion desired. It is desirable, however, that outward movement of the bolster end, which may be restricted by the stop 96, will cause that end of the bolster to raise so as to provide a certain resistance to lateral motion so that the car body will be sufficiently stable, also to use the force of gravity to return the bolster to its central position when the lateral force is relieved. That is, the bolster will be a self-centering one.

In the constructions shown in Figures 10 and 12 the inner end of the leaf spring is seated on the seat 144, the seat being provided with the positioning dowel 148 received in a suitable aperture in the spring 42. A resilient pad such as a rubber pad 149 is disposed between the seat 144 and a seat 151 provided on the inner leg of the loading, load distributing or equalizing member 78. The coil spring assembly 86 is seated on the upper spring seat member 184, the rubber or other resilient pad 185 being disposed between said spring seat and the spring seat 187 provided in the spring housing. The lower end of the spring assembly seats on the lower spring seat 187, the rubber or other resilient pad 189 being seated between the spring seat 187 and the spring seat member 188, said member being provided with the depending dowel 190 received in a suitable aperture in the outer end of the leaf spring assembly 40. The spring band 40 is seated on member 192, the rubber or other resilient pad 194 being interposed between said member and member 196, said member being provided with dowel 198 extending through aligned apertures in the spring plank 34 and side frame tension member.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

What is claimed is—

1. In a spring suspension system for car trucks, the combination of a leaf spring and a non-resilient load distributing member each having spaced connections with the other, a coil spring included in one of said spaced connections, said leaf spring and said load distributing member each having a load-transmitting seat intermediate said spaced connections.

2. In a car truck, the combination of a side frame and a leaf spring supported thereby, and a load distributing member supported by said leaf spring at spaced points adjacent the ends thereof, said load distributing member being provided with centrally disposed guide means whereby said load distributing member is centrally guided on said side frame.

3. In a car truck, the combination of a side frame and a leaf spring supported thereby, a non-resilient load distributing member supported by said leaf spring at spaced points, one of said spaced points of support including a coil spring, and a bolster supported at a central position on said load distributing member between said spaced supports.

4. In a car truck, the combination of a side frame and a leaf spring supported thereby, a coil spring supported at one end of said leaf spring, a non-resilient load distributing member supported at one end on said leaf spring and at the other end on said coil spring, and a bolster supported on said load distributing member.

5. In a car truck, the combination of a side frame and a spring supported thereby, a load distributing member supported by said spring at spaced points adjacent the ends thereof, said load distributing member having means cooperating with said side frame whereby said load distributing member is centrally guided by said side frame, and a bolster supported by said load distributing member.

6. In a car truck, the combination of a side frame and a leaf spring supported thereby, a non-resilient load distributing member supported by said leaf spring at spaced points adjacent the ends thereof said load distributing member having means cooperating with said side frame whereby said load distributing member is guided by said side frame, lateral motion means supported by said load distributing member, and a bolster carried by said lateral motion means.

7. In a car truck, the combination of a side frame and a leaf spring supported thereby, a coil spring carried by said leaf spring, a load distributing member supported by said leaf spring partly directly and partly through said coil spring, lateral motion means supported by said load distributing member, and a bolster supported by said lateral motion means.

8. In a car truck, the combination of a side frame and spring supported thereby, a second spring supported by said first named spring, a non-resilient load distributing member supported by said first named spring partly directly and partly through said second named spring, and a bolster supported by said load distributing member.

9. In a car truck, the combination of spaced side frames having window openings, spaced load distributing members disposed in said window openings and extending therethrough, spaced springs each having spaced connections with one of said load distributing members adjacent the ends thereof, said side frames and said load distributing members having cooperative means for positioning said load distributing members with respect to said side frames, and a load carrying member supported in said window openings by said load distributing members and springs.

10. In a car truck, the combination of a side frame and a spring supported thereby, a load distributing member supported at spaced points on said spring adjacent the ends thereof, guide means on said load distributing member cooperating with said side frame, and a bolster supported by said load distributing member.

11. In a car truck, the combination of a side frame and a spring supported thereby, a load distributing member supported at spaced points on said spring adjacent the ends thereof, guide means on said load distributing member cooperating with said side frame, and a bolster supported for lateral motion on said load distributing member.

12. In a car truck, the combination of a side frame and a spring supported thereby, a load distributing member supported at spaced points on said spring adjacent the ends thereof and having guide means cooperating with said side frame, lateral motion rollers mounted on said load distributing member, and a bolster carried on said lateral motion rollers.

13. In a car truck, the combination of a side frame and a spring supported thereby, a load distributing member supported at spaced points on said spring adjacent the ends thereof and having guide means cooperating with said side frame, lateral motion rockers mounted on said load distributing member, and a bolster carried on said lateral motion rockers.

14. In a car truck, the combination of a side frame and a spring supported thereby, a load distributing member supported at spaced points on said spring adjacent the ends thereof and having guide means cooperating with said side frame, lateral motion rockers mounted on said load distributing member, a bolster carried on said lateral motion rockers, and means for positioning said lateral motion rockers.

15. In a car truck, the combination of a side frame including tension and compression members and spaced column guides integrally connecting said tension and compression members forming a bolster opening therewith, a bolster extending into said opening, springs of different characteristics disposed on said side frame, and a load distributing member interposed between said springs and said bolster and directly engaging each of said springs, one of said springs supporting the other of said springs.

16. In a car truck, the combination of a side frame including tension and compression members and spaced column guides integrally connecting said tension and compression members forming a bolster opening therewith, a bolster extending into said opening, springs of different characteristics arranged in series and disposed on said side frame, and a load distributing member interposed between one of said springs and said bolster and directly engaging each of said springs.

17. In a car truck, the combination of a side frame including tension and compression members and spaced column guides integrally connecting said tension and compression members forming a bolster opening therewith, a bolster extending into said opening, springs of different characteristics disposed on said side frame, and a load distributing member interposed between said springs and said bolster and directly engaging each of said springs, said springs being disposed in series.

18. In a car truck, the combination of a side frame including tension and compression members and spaced column guides integrally connecting said tension and compression members forming a bolster opening therewith, a bolster extending into said opening, a friction member disposed on said side frame, a coil spring supported on said friction member, and a load distributing member carried by said friction member and coil spring for supporting said bolster, said load distributing member engaging said springs.

19. In a car truck, the combination of a side frame including tension and compression members and spaced column guides integrally connecting said tension and compression members forming a bolster opening therewith, a bolster extending into said opening, a semi-elliptic spring disposed on said side frame, and a load distributing member cooperating with said semi-elliptic spring adjacent the ends thereof and cooperating with said bolster and directly engaging said spring.

20. In a car truck, the combination of a side frame including tension and compression members and spaced column guides integrally connecting said tension and compression members forming a bolster opening therewith, a bolster extending into said opening, a semi-elliptic spring disposed on said side frame, and a load distributing member cooperating with said semi-elliptic spring adjacent the ends thereof and cooperating with said bolster, said load distributing member supporting said bolster for lateral movement and directly engaging said spring.

21. In a car truck, the combination of a side frame including tension and compression members and spaced column guides integrally connecting said tension and compression members forming a bolster opening therewith, a bolster extending into said opening, springs of different characteristics disposed on said side frame, and a load distributing member disposed transversely of said truck and interposed between said spring and said bolster and having means cooperating with said column guides whereby said load distributing member is guided for vertical movement by said column guides, said load distributing member supporting said bolster intermediate the points of engagement between said load distributing member and said springs.

22. In a car truck, the combination of a side frame including tension and compression members and spaced column guides integrally connecting said tension and compression members forming a bolster opening therewith, a bolster extending into said opening, springs of different characteristics disposed on said side frame, and a load distributing member disposed transversely of said truck and interposed between said springs and said bolster and embracing a portion thereof, said load distributing member supporting said bolster intermediate the points of engagement between said load distributing member and said springs.

23. In a car truck, the combination of a side frame including tension and compression members and spaced column guides integrally connecting said tension and compression members forming a bolster opening therewith, a bolster extending into said opening, springs of different characteristics disposed on said side frame, a load distributing member disposed transversely of said truck and interposed between said springs and said bolster and directly engaging each of said springs, and means permitting lateral movements of said bolster, said load distributing member supporting said bolster intermediate the points of engagement between said load distributing member and said springs.

24. In a car truck, the combination of a side frame including tension and compression members and spaced column guides integrally connecting said tension and compression members forming a bolster opening therewith, a bolster extending into said opening, springs of different characteristics disposed on said side frame, a load distributing member disposed transversely of said truck and interposed between said springs and said bolster, and means permitting lateral movements of said bolster, said load distributing member having means for limiting lateral movement of said bolster, said load distributing member supporting said bolster intermediate the points of engagement between said load distributing member and said springs.

25. In a car truck, the combination of a side frame including tension and compression members and spaced column guides integrally connecting said tension and compression members forming a bolster opening therewith, a bolster extending into said opening, springs of different characteristics disposed on said side frame, a load distributing member disposed transversely of said truck and interposed between said springs and said bolster, and a rocker interposed between said bolster and load distributing member for permitting lateral movements of said bolster, said load distributing member supporting said bolster intermediate the points of engagement between said load distributing member and said springs.

26. In a car truck, the combination of a side frame including tension and compression members and spaced column guides integrally connecting said tension and compression members forming a bolster opening therewith, a bolster extending into said opening, springs of different characteristics disposed on said side frame, a load distributing member disposed transversely of said truck and interposed between said springs and said bolster, and a rocker interposed between said bolster and side frame for permitting lateral movement of said bolster, said load distributing member supporting said bolster intermediate the points of engagement between said load distributing member and said springs.

27. In a car truck, the combination of a side frame including tension and compression members and spaced column guides integrally connecting said tension and compression members forming a bolster opening therewith, a bolster extending into said opening, springs of different characteristics disposed on said side frame, a load distributing member disposed transversely of said truck and interposed between said springs and said bolster, and a rocker interposed between said bolster and springs for permitting lateral movements of said bolster, said load distributing member supporting said bolster intermediate the points of engagement between said load distributing member and said springs.

28. In a car truck, the combination of a side frame including tension and compression members and spaced column guides integrally connecting said tension and compression members forming a bolster opening therewith, a bolster extending into said opening, springs of different characteristics disposed on said side frame, a load distributing member disposed transversely of said truck and interposed between said springs and said bolster, and a rocker interposed between said bolster and load distributing member for permitting lateral movements of said bolster, said rocker having portions of varying radii contacting said bolster and load distributing member whereby lateral movement of said bolster changes the level thereof, said load distributing member supporting said bolster intermediate the points of engagement between said load distributing member and said springs.

29. In a car truck, the combination of a side frame including tension and compression members and spaced column guides integrally connecting said tension and compression members forming a bolster opening therewith, a bolster extending into said opening, springs of different characteristics disposed on said side frame, a load distributing member disposed transversely of said truck and interposed between said springs and load distributing member for permitting lateral movements of said bolster, said rocker having portions of varying radii contacting said bolster and load distributing member whereby lateral movement of said bolster raises the level of the side of the bolster moving outwardly, said load distributing member supporting said bolster intermediate the points of engagement between said load distributing member and said springs.

30. In a car truck, the combination of a side frame including tension and compression members and spaced column guides integrally connecting said tension and compression members forming a bolster opening therewith, a bolster extending into said opening, springs of different characteristics disposed on said side frame, a load distributing member disposed transversely of said truck and interposed between said springs and said bolster, and means permitting lateral movements of said bolster, said means being arranged to cause said bolster to be self-centering, said load distributing member supporting said bolster intermediate the points of engagement between said load distributing member and said springs.

31. In a car truck, the combination of a side frame, a bolster, springs of different characteristics disposed in series on said side frame, and a floating load distributing member disposed transversely of said truck and interposed between said springs and said bolster and engaging said side frame, said load distributing member supporting said bolster intermediate the points of engagement between said load distributing member and said springs.

32. In a car truck, the combination of a side frame, a bolster, a floating load distributing member supporting said bolster and engaging said side frame, and a member carried by said side frame, said member being non-resiliently connected to said load distributing member at a point and being resiliently connected to said load distributing member at a spaced point.

33. In a car truck, the combination of a side frame, a bolster, a floating load distributing member supporting said bolster and engaging said side frame, and a member carried by said side frame, said member being non-resiliently connected to said load distributing member at a point inwardly of said side frame and being resiliently connected to said load distributing member at a spaced point.

34. In a car truck, the combination of side frames, a load carrying member extending therebetween, means on each of said side frames for supporting said load carrying member on each of said side frames, said means each including a leaf spring member and a cooperating rigid load distributing member interposed between said load carrying member and said side frame, the ends of one of the members of said means being disposed to support the ends of the other of the members of said means.

35. In a car truck, the combination of side frames, a load carrying member extending therebetween, means on each of said side frames for supporting said load carrying member on each of said side frames, said means each including a leaf spring member disposed transversely of said truck and a cooperating rigid load distributing member interposed between said load carrying member and said side frame, the ends of one of the members of said means being disposed to support the ends of the other of the members of said means.

36. In a car truck, the combination of a side frame, a load carrying member, a load distributing member having a coil spring seat disposed outwardly of said side frame and a leaf spring seat disposed inwardly of said side frame, side frame cooperating means on said load distributing member between said seats, a lateral motion track on said load distributing member disposed substantially in the plane of the side frame, lateral motion means on said track, and supporting said bolster for movement laterally of the truck, a semi-elliptic leaf spring supported on said side frame and engaging said leaf spring seat, and a coil spring supported on said leaf spring outwardly of said truck and engaging said coil spring seat.

37. In a car truck, the combination of a side frame, a load carrying member, a load distributing member for supporting said load carrying member, said load distributing member having a coil spring seat disposed outwardly of said side frame and a leaf spring seat disposed inwardly of said side frame, side frame cooperating means on said load distributing member between said seats, a semi-elliptic leaf spring supported on said side frame and engaging said leaf spring seat, and a coil spring supported on said leaf spring outwardly of said truck and engaging said coil spring seat.

38. In a car truck, the combination of a side frame, a load carrying member, a load distributing member having spring seats thereon disposed on each side of said side frame, a lateral motion track on said load distributing member disposed substantially in the plane of the side frame, lateral motion means on said track and supporting said bolster for movement laterally of the truck, and transversly disposed leaf spring means on said side frame for supporting said load distributing member at said spaced spring seats, said load distributing member having means for limiting lateral movement of said load carrying member.

39. In a car truck, the combination of a said frame, a load carrying member, a load distributing member for supporting said load carrying member having portions embracing said load carrying member and cooperating with said side frame, said load distributing member having spring seats disposed at different levels thereon for accommodating springs of different character, said seats being disposed on each side of said side frame, and spring means on said side frame for supporting said load distributing member at said spaced spring seats adjacent the ends of said spring means.

40. In a car truck, the combination of a side frame, a load carrying member, a load distributing member having a coil spring seat disposed outwardly of said side frame and a leaf spring seat disposed inwardly of said side frame, a lateral motion track on said load distributing member disposed substantially in the plane of the side frame, lateral motion means on said track and supporting said bolster for movement laterally of the truck, a semi-elliptic leaf spring supported on said side frame and engaging said leaf spring seat, and a coil spring supported on said leaf spring outwardly of said truck and engaging said coil spring seat.

41. In a car truck, the combination of a side frame, a bolster, springs of different characteristics disposed on said side frame, and a transversely arranged floating rigid load distributing member interposed between said springs and said bolster and engaging said side frame and each of said springs, said load distributing member supporting said bolster intermediate the points of engagement between said load distributing member and said springs.

42. In a car truck, the combination of a side frame, a bolster, a rigid load distributing member supporting said bolster and engaging said side frame, and a member carried by said side frame, said member being non-resiliently connected to said rigid load distributing member at a point and being resiliently connected to said load distributing member at a spaced point.

43. In a car truck, the combination of a side frame, a bolster, a floating rigid load distributing member supporting said bolster and engaging said side frame, and a member carried by said side frame, said member being non-resiliently connected to said rigid load distributing member at a point inwardly of said side frame and being resiliently connected to said rigid load distributing member at a spaced point.

44. In a car truck, the combination of a side frame, a bolster, a floating rigid load distributing member supporting said bolster and engaging said side frame, and a member carried by said side frame, said member being connected non-resiliently to said rigid load distributing member at a point inwardly of said side frame and being resiliently connected to said rigid load distributing member at a point outwardly of said side frame.

45. In a car truck, the combination of a side frame, a bolster, a floating rigid load distributing member supporting said bolster and engaging said side frame, and a member carried by said side frame, said member being connected to said rigid load distributing member at spaced points, one of said points of connection being resilient and the other being non-resilient.

46. In a car truck, the combination of spaced side frames having window openings, spaced load distributing members disposed in said window openings, spaced springs each having spaced connections with one of said load distributing members adjacent the ends thereof, said side frames and said load distributing members having cooperative means for positioning said load distributing members with respect to said side frames, and a load carrying member supported in said window openings by said load distributing members and springs.

Signed at Chicago, Illinois, this 9th day of September, 1931.

WILLIAM C. HEDGCOCK.